United States Patent [19]

Tomite et al.

[11] 4,383,193
[45] May 10, 1983

[54] FIELD POLE STRUCTURE OF DC MOTOR

[75] Inventors: Tosio Tomite, Katsuta; Humio Tajima, Ibaraki; Syuichi Takamastu, Hitachi, all of Japan

[73] Assignee: Hitachi, Ltd., Tokyo, Japan

[21] Appl. No.: 306,235

[22] Filed: Sep. 28, 1981

[30] Foreign Application Priority Data

Sep. 29, 1980 [JP] Japan .............................. 55-134325

[51] Int. Cl.³ ............................................. H02K 21/26
[52] U.S. Cl. ..................................... 310/154; 335/302
[58] Field of Search ............... 310/154, 254, 156, 190, 310/42, 155, 181, 177, 152, 46, 153; 335/302

[56] References Cited

U.S. PATENT DOCUMENTS

| 3,594,599 | 7/1971 | West | 310/154 |
|---|---|---|---|
| 3,939,371 | 2/1976 | Murakami | 310/154 |
| 4,110,718 | 8/1978 | Odor et al. | 310/154 |
| 4,112,320 | 9/1978 | Mohr | 310/154 |
| 4,237,397 | 12/1980 | Mohr et al. | 310/154 |

FOREIGN PATENT DOCUMENTS 46-39907 9/1971 Japan .................................. 310/154

Primary Examiner—R. Skudy
Attorney, Agent, or Firm—Antonelli, Terry & Wands

[57] ABSTRACT

A field pole structure of a DC motor has a plurality of field magnetic poles attached to the inner surface of a yoke of the DC motor to oppose an armature. Each magnetic pole includes a permanent magnet, and an auxiliary pole member coupled to an end of the permanent magnet directed in opposition to the rotational direction of the armature and having permeability higher than reversible permeability of the permanent magnet. The permanent magnet has a single magnet body constructed by integrally formed first and second magnet members, the first magnet member being disposed at a half of the permanent magnet remote from the auxiliary pole member and made of a magnetic material of large coersive force, and the second magnet member being interpoled between the first magnet member and the auxiliary pole member and made of a magnetic material of large residual magnetic flux density, the boundary portion between the first and second magnet members being a region in which the magnetic material of large coersive force and the magnetic material of large residual magnetic flux density are mixed.

2 Claims, 4 Drawing Figures

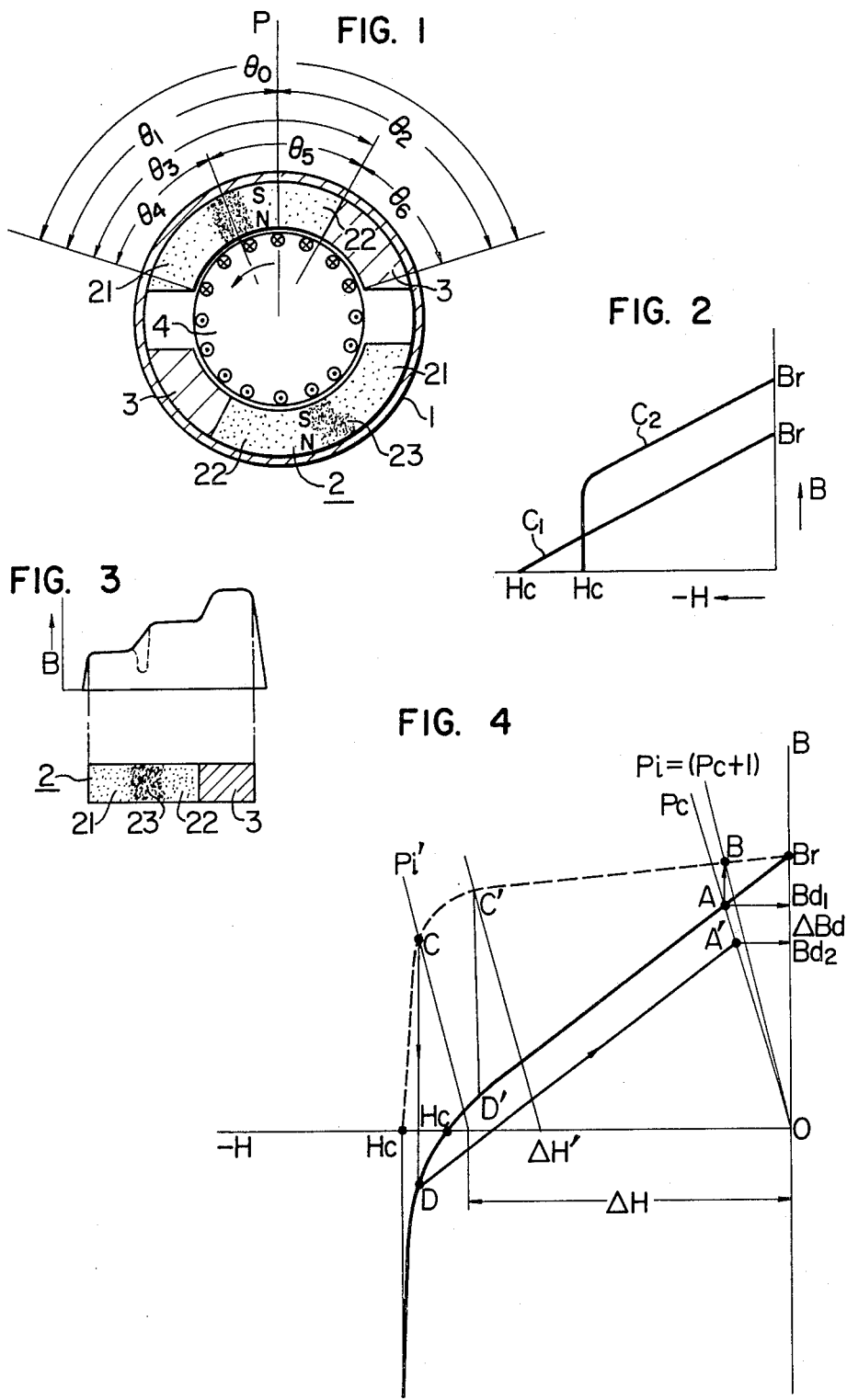

FIELD POLE STRUCTURE OF DC MOTOR

This invention relates to a field pole structure of a DC motor having a plurality of field magnetic poles with permanent magnets and more particularly to a field pole structure of a DC motor which is suitable for an internal combustion engine starter.

As well known in the art, it is advantageous that a DC motor with permanent magnets used as the internal combustion engine starter possesses series motor characteristics. In addition, from the standpoint of motor characteristics (torque and the number of revolutions), it is desirable to mitigate permanent demagnetization (irreversible demagnetization) in the permanent magnets which results from the armature reaction. Japanese Patent Application Laid-open No. 39907/73 discloses an example of a permanent magnet type DC motor having series motor characteristics and increased resistibility to demagnetization. The DC motor disclosed therein has field magnetic poles disposed circumferentially of the armature wherein each magnetic pole consists of a permanent magnet of large coersive force (Hc) disposed in one end region of the pole in which demagnetizing effect due to the armature reaction is maximized, a permanent magnet of large residual magnetic flux density (Br) disposed in a central region of the pole which undergoes weak demagnetizing effect and weak magnetizing effect, and an auxiliary pole member of higher permeability than reversible permeability of the permanent magnets which is disposed in the other end of the pole which undergoes magnetizing effect due to the armature reaction. The permanent magnet of large coercive force is effective to minimize permanent demagnetization of this magnet under the influence of a magnetizing force due to the armature reaction, and the permanent magnet of large residual magnetic flux density is effective to increase magnetic flux so as to improve torque characteristics. The auxiliary pole member of high permeability effective utilizes magnetic flux due to the armature reaction to obtain series motor characteristics such that torque increases in response to increase of armature current. Thus, the DC motor set out herein has large resistibility to permanent demagnetization and the series motor characteristics. Permanent demagnetization or irreversible demagnetization of the permanent magnet means that the permanent magnet is permanently reduced in its capability of generating magnetic flux under the influence of reverse magnetization due to the armature reaction. Thus, even after removal of the armature reaction, magnetic flux density generated from the permanent magnet remains reduced.

The magnetic pole of the above construction has disadvantages as below. When mounting the pole to a yoke, an adhesive sheet or a bonding agent is applied between the yoke and the pole, the pole is pressed against the inner surface of the yoke by means of a suitable pressing device possessed of a spring force, and the resulting assembly is dried by heating. Where one pole is constituted by three component parts, namely, two permanent magnets having different magnetic characteristics as set forth above and one auxiliary pole member, three pressing devices are required for a two-pole motor and six pressing devices for a four-pole motor. This accounts for the fact that, in a relatively compact motor such as used, for example, for an internal combustion engine starter, positioning and fixing of the pole component parts to the yoke becomes complicated, thus degrading producibility. To make matters worse, a rapid change of magnetic flux density takes place in the motor air gap adjacent to the junction of the large coercive force permanent magnet and the large residual magnetic flux density permanent magnet, thereby causing noise and vibration.

An object of this invention is to provide a field pole structure having a plurality of magnetic poles with permanent magnets in which the number of component parts for constituting one pole can be reduced to thereby facilitate assembling of the pole and improve producibility and which is capable of smoothing the change of magnetic flux density in the motor air gap to thereby improve performances.

According to the invention, each of the magnetic poles of the field pole structure comprises a single permanent magnet constructed by two integrally formed magnet members, one of the magnet members being made of a magnetic material of large coersive force (Hc) and the other magnet member made of a magnetic material of large residual magnetic flux density (Br), and an auxiliary pole member disposed in juxtaposition with the permanent magnet and having permeability higher than reversible permeability of the permanent magnet, the permanent magnet having, at the boundary portion between the two magnet members, a region in which the magnetic material of large coersive force and the magnetic material of large residual magnetic flux density are mixed.

The invention will be described in detail with reference to the accompanying drawings in which:

FIG. 1 is a sectional view taken vertically to the axis of a DC motor with a field pole structure embodying the invention;

FIG. 2 is a graphic diagram for explaining magnetic characteristics of magnetic materials of a permanent magnet used in the field pole structure of the DC motor shown in FIG. 1;

FIG. 3 is a diagrammatic representation of magnetic flux density distributions in the air gap of the DC motor shown in FIG. 1; and FIG. 4 is a graphic diagram for explaining determination of the position of the magnetic material mixed region in the permanent magnet used in the DC motor shown in FIG. 1.

The invention will now be described by way of example, with reference to FIGS. 1 to 4. FIG. 1 shows, for illustration only, a two-pole motor in which each magnetic pole is fixed to the inner surface of a yoke 1 to oppose an armature 4, having a permanent magnet 2 and an auxiliary pole member 3 disposed circumferentially in juxtaposition with the permanent magnet and having permeability higher than reversible permeability of the permanent magnet. When current flows through windings of the armature 4 in a direction as indicated in FIG. 1, the armature 4 is rotated in a direction as shown by an arrow. In case of no-loading, the armature 4 is applied with only field flux generated from the permanent magnet 2 and rotated at a finite number of revolutions. When loading, the armature reaction due to armature current affects the magnetic poles in such a manner that demagnetizing effect takes place in a rotational direction region $\theta_1$ and magnetizing effect takes place in a counter-rotational direction region $\theta_2$, with a neutral line P. The demagnetizing and magnetizing effects become greater toward opposite ends of the magnetic pole, respectively.

The permanent magnet 2 has a single magnet body constructed by integrally formed magnet members 21 and 22. The magnet member 21 is made of a magnetic material of large coersive force which is disposed in a portion designated by an angle $\theta_4$, and the magnet member 22 is made of a magnetic material of large residual magnetic flux density which is disposed in a portion designated by an angle $\theta_5$. The auxiliary pole member 3 is disposed in a portion designated by an angle $\theta_6$ and coupled to the end of the permanent magnet directed in opposition to the rotational direction of the armature. The permanent magnet 2 has, at the boundary portion between the magnet members 21 and 22, a region 23 in which the magnetic material of large coersive force and the magnetic material of large residual magnetic flux density are mixed. Generally, a large coersive force magnetic material has small residual magnetic flux density (Br) as shown at curve $C_1$ in FIG. 2 whereas a large residual magnetic flux density magnetic material has small coersive force (Hc) as shown at curve $C_2$. The magnetic member 21 is affected by demagnetizing effect due to the armature reaction and therefore subject to a reverse magnetizing force, but its large coersive force suppresses permanent demagnetization to thereby prevent such a situation that the direction of flux is inverted. Part of the magnet member 22 is also subjected to the demagnetizing field, but is almost freed from permanent demagnetization if the region of magnet member 22 is suitably defined by determining the position of the magnetic material mixed region 23 as will be described later. Accordingly, the magnet member 22 is rather made of the magnetic material of large residual magnetic flux density so that magnetic flux may be increased. The high permeability auxiliary pole member disposed in the portion designated by the angle $\theta_6$ in which magnetizing effect due to the armature reaction is large is effective to obtain the series motor characteristics as described hereinbefore. The auxiliary pole member may be dispensed with by employment of a rare earth magnet having both large coersive force and large residual magnetic flux density and hence suitable for improving performances of the permanent magnet type starter. The rare earth magnet is, however, expensive and impractical.

In this embodiment, each magnetic pole is composed of two component parts, i.e. the permanent magnet 2 and the auxiliary pole member 3. Accordingly, only four pressing devices suffice for a four-pole motor and positioning and fixing of the pole component parts to the yoke is simplified as compared with the aforementioned prior art requiring three separate pole component parts, thereby improving producibility.

The magnetic flux density distribution taking place in the motor air gap at the time of loading will now be described with reference to FIG. 3. The distribution in the prior art is subject to a rapid change (decrease) at the junction of the large coersive force permanent magnet and the large residual magnetic flux density permanent magnet as shown by a dotted curve. In contrast therewith, since the embodiment of this invention eliminates that junction and instead provides, at the boundary portion between the magnet members 21 and 22, the magnetic material mixed region in which the magnetic materials of large coersive force and the magnetic material of large residual magnetic flux density are mixed, the magnetic flux density rises smoothly, in the direction from the magnet member 21 to the magnet member 22, so that magnetic flux can be increased as compared with that of the prior art to ensure improved motor performances and the rapid change in the magnetic flux density distribution can be removed to prevent the generation of noise and vibration. The rapid change in the magnetic flux density at the junction of the two permanent magnets in the prior art is presumably due to juxtaposition of the same polarities of the separate permanent magnets and consequent generation of repulsive force between these permanent magnets.

The pole enclosure, that is, a region occupied by the magnetic pole consisting of the permanent magnet 2 and the auxiliary pole member 3 along the circumference of the armature 4 is determined in consideration of physical dimensions and output characteristics of the motor, and has a dimension of $\theta_0/\theta =$ about 0.7 where $\theta$ is the interpole mechanical angle which is 180° for two-pole motors and 90° for four-pole motors, and $\theta_0$ is an angle between lines connecting the opposite ends of the pole to the center of the armature (motor axis), that is, an angle defining the region which the pole occupies circumferentially of the armature. Within the pole enclosure, dimensions of regions occupied by the permanent magnet 2 and the auxiliary pole member 3 are experimentally determined which approximately correspond to $\theta_3/\theta = 0.5$ and $\theta_6/\theta = 0.2$, respectively, where $\theta_3$ is an angle defining the region acupied by the permanent magnet 2 (or an angle between lines connecting the opposite ends of the permanent magnet to the armature center) and $\theta_6$ is an angle defining the region occupied by the auxiliary pole member 3 (or an angle between lines connecting the opposite ends of the auxiliary pole member to the armature center).

The position of the magnetic material mixed region 23 is determined as explained below.

FIG. 4 shows a B—H curve of the magnet member 22, a $4\pi I$—H curve obtained from the B—H curve ($4\pi I$ is indicative of intensity of magnetization; $4\pi I = B - H$), an operating line Pc obtained from a magnetic circuit involved, an operating line Pi obtained from a point B on the $4\pi I$—H curve corresponding to an operating point A on the operating line Pc, an operating line Pi' resulting from translational motion of the operating line Pi in conformity with a demagnetizing field $\Delta H$ applied to the magnet member 22, and an operating point A' after application of the demagnetizing field $\Delta H$, which is obtained from an intersecting point C of the $4\pi I$—H curve and the operating line Pi' and an intersecting point D of the B—H curve and a perpendicular passing through the point C. As will be seen from FIG. 4, the magnetic flux density for the operating point moves from $Bd_1$ to $Bd_2$ under the application of the demagnetizing field $\Delta H$ and a permanent demagnetization corresponding to $\Delta Bd = Bd_1 - Bd_2$ is caused in the magnet mamber 22. Accordingly, with a demagnetizing field $\Delta H'$ which causes the intersecting point D' of the B—H curve and the perpendicular passing through the intersecting point C' of the operating line Pi' for the demagnetizing point $\Delta H'$ and $4\pi I$—H curve to lie on a linear portion of the B—H curve, the magnet member 22 will not be liable to permanent demagnetization. When an equivalent position to the demagnetizing field $\Delta H'$ is obtained from an armature reaction magnetomotive force curve along the circumference of the armature, this position is dedicated to the position of the magnetic material mixed region 23. It will be readily seen that for the magnetic material mixed region positioned in this manner, the magnet member 22 will not undergo permanent demagnetization. For example, assuming that $\theta_4$ is an angle defining the region of magnet member 21 extending from the center of the magnetic material mixed region in the armature rotational direction and $\theta_5$ is an angle defining the region of magnet member 22 extending in the direction opposite to the armature rotational direction, $\theta_4/\theta = \theta_5/\theta = 0.25$ is obtained.

Both the magnet members 21 and 22 are made of strontium ferrite, commercially available and represented by $SrO.nFe_2O_3$, and they can possess respective desired magnetic characteristics by suitably selecting the mixing ratio and a small amount of additive. The auxiliary pole member 3 is made of a ferromagnetic material, for example, iron. In accordance with exemplary magnetic characteristics of the magnet members 21 and 22 as applied to a motor used as an ordinary starter for small-sized or medium-sized automobiles of 1000 cc to 2000 cc displacement, the magnet member 21 has coersive force of from 4000 to 5000 oersteds, and the magnet member 22 has residual magnetic flux density of from 3500 to 4000 gausses.

The permanent magnet 2 is prepared as follows. Strontium ferrite of large coersive force and strontium ferrite of large residual magnetic flux density are calsined independently, and the calsined materials are separately ground in water to produce slurries. A molding box is prepared which has a configuration conforming to a desired shape of the permanent magnet and incorporates a partition plate held in a predetermined place corresponding to the position of the magnetic material mixed region 23. One of the slurries is pressed into a chamber on one side of the partition plate and the other slurry is pressed into a chamber on the other side. Subsequently, the partition plate is removed, and the slurries filled in the molding box are press-molded. At this time, both the slurries expand into the void left behind after removal of the partition plate and its vicinity so that they are mixed in these portions, and water in the slurries is removed to produce a strontium ferrite mold. This mold is then sintered and finished to produce the permanent magnet 2.

In comparison with the prior art, the foregoing embodiment reduces the number of component parts per one magnetic pole to thereby improve producibility. Further, in contrast to the prior art, magnetic flux density in the motor air gap is not reduced but is increased so that torque can be increased when high loading is required for starting or cranking, for example. In addition, the rapid change of magnetic flux density distribution in the air gap is eliminated, thereby preventing generation of noise and pulsating vibration in the motor.

What is claimed is:

1. A field pole structure of a DC motor having an armature, and a yoke disposed concentrically with the armature, comprising a plurality of field magnetic poles attached to the inner surface of the yoke to oppose the armature, each magnetic pole including a permanent magnet, and an auxiliary pole member coupled to an end of the permanent magnet directed in opposition to the rotational direction of the armature and having permeability higher than a reversible permeability of the permanent magnet, said permanent magnet including a first magnet member disposed at a half of the permanent magnet remote from said auxiliary pole member and made of a magnetic material of large coersive force, and a second magnet member interposed between the first magnet member and the auxiliary pole member and made of a magnetic material of large residual magnetic flux density, wherein said first and second magnet members are formed integrally, and wherein said permanent magnet comprises, in a boundary portion between said first and second magnet members, a region in which the magnetic material of large coersive force and the magnetic material of large residual magnetic flux density are mixed.

2. A field pole structure according to claim 1, wherein said region in which the magnetic material of large coersive force and a magnetic material of large residual magnetic flux density are mixed is of a size for enabling the magnetic flux density to rise smoothly in the direction from said first magnetic member to said second magnetic member.

* * * * *